United States Patent
Oin

(10) Patent No.: US 8,858,854 B2
(45) Date of Patent: Oct. 14, 2014

(54) SYSTEM AND METHOD FOR PLASTIC OVERMOLDING ON A METAL SURFACE

(75) Inventor: Jichen (Jeff) Oin, Guang Zhou (CN)

(73) Assignee: Flextronics AP, LLC, Broomfield, CO (US)

( * ) Notice: Subject to any disclaimer, the term of this patent is extended or adjusted under 35 U.S.C. 154(b) by 556 days.

(21) Appl. No.: 13/077,274

(22) Filed: Mar. 31, 2011

(65) Prior Publication Data

US 2011/0250377 A1 Oct. 13, 2011

Related U.S. Application Data

(60) Provisional application No. 61/320,187, filed on Apr. 1, 2010.

(51) Int. Cl.
| | |
|---|---|
| *B29C 45/14* | (2006.01) |
| *B32B 15/08* | (2006.01) |
| *B32B 3/08* | (2006.01) |
| *B29K 705/00* | (2006.01) |
| *B29K 705/02* | (2006.01) |

(52) U.S. Cl.
CPC ........... *B32B 15/08* (2013.01); *B29C 45/14311* (2013.01); *B29C 2045/14868* (2013.01); *B29K 2705/00* (2013.01); *B32B 3/085* (2013.01); *B29K 2705/02* (2013.01)
USPC .......................................... 264/241; 264/259

(58) Field of Classification Search
CPC ..................... B32B 15/08; B32B 3/085; B29C 2045/14868; B29C 45/14; B29C 45/14311; B29K 2705/00; B29K 2705/02
USPC .................................................. 264/241, 259
See application file for complete search history.

(56) References Cited

U.S. PATENT DOCUMENTS

| | | |
|---|---|---|
| 3,122,598 A | 2/1964 | Berger |
| 6,574,096 B1 | 6/2003 | Difonzo et al. |
| 6,620,371 B1 | 9/2003 | Winget et al. |
| 6,768,654 B2 | 7/2004 | Arnold et al. |
| 6,905,777 B2 | 6/2005 | Near |
| 8,367,210 B2 * | 2/2013 | Naritomi et al. .............. 428/420 |

(Continued)

FOREIGN PATENT DOCUMENTS

| | | | |
|---|---|---|---|
| JP | 2004-268936 | * | 9/2004 |
| WO | 2004-041532 | * | 5/2004 |
| WO | 2005-109984 | * | 11/2005 |
| WO | WO 2009 011398 A1 | | 1/2009 |

OTHER PUBLICATIONS

Dynasylan HYDROSIL 2909, EVONIK Industries, product information, 2014, one page.*

(Continued)

*Primary Examiner* — Jill Heitbrink
(74) *Attorney, Agent, or Firm* — Haverstock & Owens LLP

(57) ABSTRACT

A plastic-metal hybrid part includes an anodized metal substrate having plastic structures formed on the metal substrate. In a particular embodiment, the metal hybrid part is an electronic device enclosure and plastic structures are mounting features formed on the enclosure. Methods for manufacturing the plastic-metal hybrid part are also disclosed. In a particular embodiment, the metal substrate undergoes a pretreatment, is anodized after the pretreatment, and the plastic structures are molded directly on the anodized exterior surface of the metal substrate. In another embodiment, the anodized metal substrate is primed with a coupling agent before the plastic features are formed thereon.

18 Claims, 11 Drawing Sheets

(56) References Cited

U.S. PATENT DOCUMENTS

| | | | |
|---|---|---|---|
| 2005/0079326 | A1 | 4/2005 | Varaprasad et al. |
| 2006/0257624 | A1* | 11/2006 | Naritomi et al. ............. 428/141 |
| 2009/0260871 | A1 | 10/2009 | Weber |
| 2009/0274889 | A1 | 11/2009 | Iwahashi et al. |

OTHER PUBLICATIONS

Silicones in Industrial Applications, Chapter 19 Organo-Functional Silanes, Dow Corning, 2007, eight pages.*
Organosilane Technology in Coating Applications: Review and Perspectives, Dow Corning, 2006, pp. 1-16.*
PCT Application No. PCT/US2011/030955, International Search Report and Written Opinion dated Jun. 10, 2011.
*Adhesion Promotion of Poly (Phenylene Sulfide) to Aluminum Treated With Silane Coupling Agents*; Nguyen et al.; Journal of Adhesion Science & Technology, vol. 20, No. 2-3, pp. 197-208 (2006).
*ANM (Aluminum Non-Adhesive Molding), Bonding of Aluminum Part With Plastic During Injection Molding Without Any Medium (Adhesive)*; Samyoung Connect, Feb. 2009.
*An Overview of Polymer-to-Metal Direct-Adhesion Hybrid Technologies for Load-Bearing Automotive Components*; Grujicic et al.; Journal of Materials Processing Technology, vol. 197, pp. 363-373 (2008).
*Electrochemical Reaction in the Polymer Plating of Triazine Dithiols*; Mori et al.; Polymer Journal, vol. 35, No. 7, pp. 567-572 (2003).
*MAM (Metal Adhesive Molding) Technology*; Samyoung Connect, Korea, Apr. 2008.
*NMT Nano-Molding Technology, Aluminum And Resin Integration Technology*; Taisei Plas Co., Ltd., document dated Mar. 11, 2006.
*Polymer Injection Forming, A New Technology For Your High Performance Metal-Polymer Products*; Ir Jan-Willem Slijkoord; Corus, (undated document).
*Surface Modification of Magnesium Alloys Using Triazine Dithiols*; Kang et al.; Science Direct, Surface and Coatings Technology, vol. 195, pp. 162-197 (2005).
*Acidic Degreasing*; sufacepretreatment.com; Copyright 2007; Downloaded from the internet on Mar. 2, 2011; http://www.sufacepretreatment.com/.
*Alkaline Cleaning*; Gerald J. Cormier; Parker + Amchem; Henkel Corporation; Downloaded from the internet on Mar. 2, 2011; http://www.asminternational.org/portal/site/www/AsmStore/Product/.
*Alkaline Degreasing*; sufacepretreatment.com; Copyright 2007; Downloaded from the internet on Mar. 2, 2011; http://www.sufacepretreatment.com/.
*Anodizing*; Katya; PriMetals; Oct. 20, 2009; Downloaded from the internet on Mar. 2, 2011; http://www.primetals.com/.
*Anodizing*; Mario S. Pennisi; Copyright 1999 / 2001; Coatings + Fabrication; Downloaded from the internet on Mar. 2, 2011; http://www.coatfab.com/anodizing.htm.
*Anodizing*; Wikipedia, the free encyclopedia; Downloaded from the internet on Mar. 2, 2011; http://en.wikipedia.org/wiki/Anodizing.
*Industrial Metal Cleaning For Aluminum Neutral and Alkaline*; Hubbard-Hall Corp.; Copyright 2011; Downloaded from the internet on Mar. 2, 2011; http://www.hubbardhall.com/chemical-apps-aluminum-soak.htm.
*Surface Cleaning*; Katya; PriMetals; Oct. 20, 2009; Downloaded from the internet on Mar. 2, 2011; http://www.primetals.com/.
Jeng, M.-C. et al., Rapid Mold temperature Control In Injection Molding By Using Steam Heating, International Communications in Heat and MAss transfer, vol. 37(2010), pp. 1295-1304.
Wang, G. et al., Research of Thermal Response Simulation and Mold Structure Optimization for Rapid Heat Cycle Molding Processes, Respectively, With Steam Heating and Electric Heating, Materials and Design, vol. 31 (2010), pp. 382-395.

* cited by examiner

SYSTEM AND METHOD FOR PLASTIC OVERMOLDING ON A METAL SURFACE

RELATED APPLICATIONS

This application claims the benefit of priority to U.S. Provisional Patent Application Ser. No. 61/320,187 filed Apr. 1, 2010 by the same inventor and entitled "System And Method For Plastic Overmolding On A Metal Surface," which is incorporated by reference herein in its entirety.

BACKGROUND OF THE INVENTION

1. Field of the Invention

This invention relates generally to polymer metal hybrid (PMH) technology, and more particularly to forming plastic features on metallic substrates.

2. Description of the Background Art

Polymer metal hybrid (PMH) technologies are currently being used to manufacture a wide variety of parts such as, for example, electronic device enclosures, automotive instrument panels, etc. In general, PMH technology refers to the various known techniques of bonding polymers to metal. Some of the more common applications that employ PMH techniques involve forming plastic features (e.g., mounting bosses, snap fits, reinforcement ribs, etc.) directly on metal surfaces such that the end product is a single part integrally formed from both metal and plastic features. For example, cellular phone housings often include a plurality of plastic mounting features (e.g., screw boss, snap-fits, etc.) molded directly on the interior surface of a thin metal shell. PMH technology can potentially provide several advantages over traditional all-metal/all-plastic parts including lowering manufacturing costs, lowering number of components in the overall hosting device, size/weight reduction, providing more design freedom, etc. Although such advantages are desirable to manufacturers, conventional PMH technologies typically cannot achieve very high plastic-to-metal bond strengths and are, therefore, only practical in a select few applications. As a result, continued research and development efforts focus on improving the plastic-to-metal bond strengths in PMH technologies. It is predicted that more and more all-metal/all-plastic parts will be replaced by PMH parts as bonding strengths continue improve. Therefore, it would be desirable to develop PMH techniques with improved polymer-to-metal bonding strengths.

Currently, plastic features can be formed on metal surfaces using several known variations of PMH technology such as, for example, nano-molding technology (NMT), metal adhesive molding (MAM) technology, aluminum non-adhesive molding (ANM), polymer injection forming, etc.

Forming plastic features on metal parts via NMT involves multiple steps that are summarized as follows. First, the bare metal part undergoes a multi-stage pretreatment process to remove unwanted grease, oil, oxides, etc. This involves subjecting the metal part to multiple chemicals baths including degreasing agents, acid solutions, base solutions, etc. After the multi-stage pretreatment process, the metal part is submerged in a T-solution. Then, the treated metal part is rinsed in diluted water. Finally, the metal part is inserted into a mold wherein resin is injected and formed directly on the treated surface.

Although NMT may be suitable for some applications, it has some shortcoming. For example, NMT requires a tedious multi-stage pretreatment process. As another example, the overall NMT process requires the use of hazardous chemicals. As yet another example, the polymer-to-metal bond achieved via NMT has a relatively short shelf-life, with the adhesion strength diminishing after several weeks of storage. Therefore, NMT is not practical for many applications.

What is needed, therefore, is a simpler system and method for manufacturing PMH parts. What is also needed is a system and method for manufacturing PMH parts that can achieve higher polymer-to-metal bonding strengths. What is also needed is a system and method for manufacturing PMH parts using less hazardous materials.

SUMMARY

The present invention overcomes the problems associated with the prior art by providing a system and method for manufacturing plastic-metal hybrid parts having an anodized metal substrate with plastic structures formed directly thereon.

A plastic-metal hybrid part includes a metal substrate and a plastic structure formed thereon. The exterior surface defines a plurality of irregularities formed thereon via anodizing. The plastic features are formed directly over the anodized exterior surface of the metal substrate such that the plastic material infiltrates, and is cured in, the irregularities to form a mechanical bond between the plastic structure and the metal substrate. In this context, the term "exterior" refers to the exterior surface of the metal, and not necessarily to the exterior of some component formed from the metal. For example, an exterior surface of the metal can form an interior surface of a housing formed by the metal.

An example method for manufacturing a plastic-metal hybrid parts includes providing a metal substrate having a first exterior surface, providing a moldable plastic material, anodizing the metal substrate to form irregularities on at least a portion of the first exterior surface of the metal substrate, and forming a plastic structure directly on the metal substrate by molding the moldable plastic material directly over the irregularities formed on the first exterior surface of the metal substrate.

In the example method, the metal substrate is a stamped sheet metal substrate. The metal substrate can be formed from materials including, but not limited to, aluminum, 5052 aluminum, aluminum alloy, titanium, titanium alloy, magnesium, and/or magnesium alloy. The step of anodizing the metal substrate can include, without limitation, anodizing the metal substrate using an anodizing agent selected from the group consisting of chromic acid, phosphoric acid, sulfuric acid, oxalic acid, and boric acid.

Optionally, the step of molding the moldable plastic includes overmolding the moldable plastic directly over the irregularities formed on the first exterior surface of the metal substrate. As another option, the step of molding the moldable plastic includes injection molding the moldable plastic directly over the irregularities formed on the first exterior surface of the metal substrate. As yet another option, the step of molding the moldable plastic includes transfer molding the moldable plastic directly over the irregularities formed on the first exterior surface of the metal substrate. Moreover, processes involving combinations of these molding methods can be used to form the vaious molded features on the first exterior surface of the metal substrate. In the example methods, the moldable plastic material is selected, without limitation, from the group consisting of polyamide, polycarbonate, acrylonitrile butadiene styrene copolymer, polyphenyl sulfide, polypropylene, polybutylene terephthalate, and polyethylene terephthalate. The moldable plastic material can be a thermoplastic and/or an injection moldable thermosetting plastic.

An example method further includes subjecting the metal substrate to a pretreatment process prior to the step of anodizing the metal substrate. The pretreatment process includes applying a degreasing agent to the metal substrate, applying an alkaline solution to the metal substrate after the step of applying the degreasing agent to the metal substrate, rinsing the metal substrate with deionized water after the step of applying an alkaline solution to the metal substrate, applying an acid solution to the metal substrate after the step of rinsing the metal substrate in deionized water, and rinsing the metal substrate with deionized water after the step of applying an acid solution to the metal substrate.

The disclosed method further includes applying a primer material to the exterior surface of the metal substrate whereon the irregularities are formed. The step of applying the primer material to the exterior surface of the metal substrate is carried out after the step of anodizing the metal substrate and before the step of forming the plastic structure on the metal substrate. The primer material is adapted to bond to both the metal substrate and the moldable plastic material. Suitable primer materials include, but are not limited to, organosilane, titanate, aluminate, phosphate, and zirconate.

In the example methods, the types of plastic structures that can be formed on the metal substrate include, but are not limited to, a fastener feature, a mounting boss, and a snap-fit fastener. In a particular example method, the metal substrate is a thin-walled structure and the plastic structure is a stiffener operative to rigidify the thin walled structure.

An example plastic-metal hybrid part is also disclosed and includes an anodized metal substrate having a first exterior surface. The first exterior surface defines irregularities formed therein via anodizing. The part also includes a plastic structure molded directly on the anodized metal substrate over the irregularities formed in the first exterior surface of the metal substrate. The irregularities are infiltrated by portions of the plastic structure such that the plastic structure is mechanically bonded to the anodized metal substrate.

In an example plastic-metal hybrid part, the anodized metal substrate is stamped sheet metal. The sheet metal substrate can be formed from a suitable material including, but not limited to, aluminum, 5052 aluminum, aluminum alloy, titanium, titanium alloy, magnesium, and/or magnesium alloy. The metal substrate can be anodized using an anodizing agent including, but not limited to, chromic acid, phosphoric acid, sulfuric acid, oxalic acid, and/or boric acid.

The plastic structure(s) can be overmolded, injection molded, and/or transfer molded directly on the anodized metal substrate. The plastic structure is formed from a suitable material including, but not limited to, polyamide, polycarbonate, acrylonitrile butadiene styrene copolymer, polyphenyl sulfide, polypropylene, polybutylene terephthalate, and/or polyethylene terephthalate. The plastic structure can be formed from thermoplastic or a transfer moldable thermosetting plastic.

The plastic-metal hybrid part additionally includes a layer of primer material formed on the irregularities, the plastic structure being molded directly on the layer of primer material. The primer material can be, without limitation, organosilane, titanate, aluminate, phosphate, and/or zirconate.

The plastic structure can be a mounting feature. As another example, the plastic structure can be an assembly alignment feature. As yet another example, the metal substrate is a thin walled housing structure, and the plastic structure is stiffener operative to rigidify the thin walled housing structure.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a system and method for manufacturing plastic-metal hybrid parts having both plastic and metal features integrally formed into a single structure. In the following description, numerous specific details are set forth (e.g., host device details) in order to provide a thorough understanding of the invention. Those skilled in the art will recognize, however, that the invention may be practiced apart from these specific details. In other instances, details of well known manufacturing practices (e.g., plastic injection molding, mold tooling, metal stamping processes, etc.) and components have been omitted, so as not to unnecessarily obscure the present invention.

Figure 1:
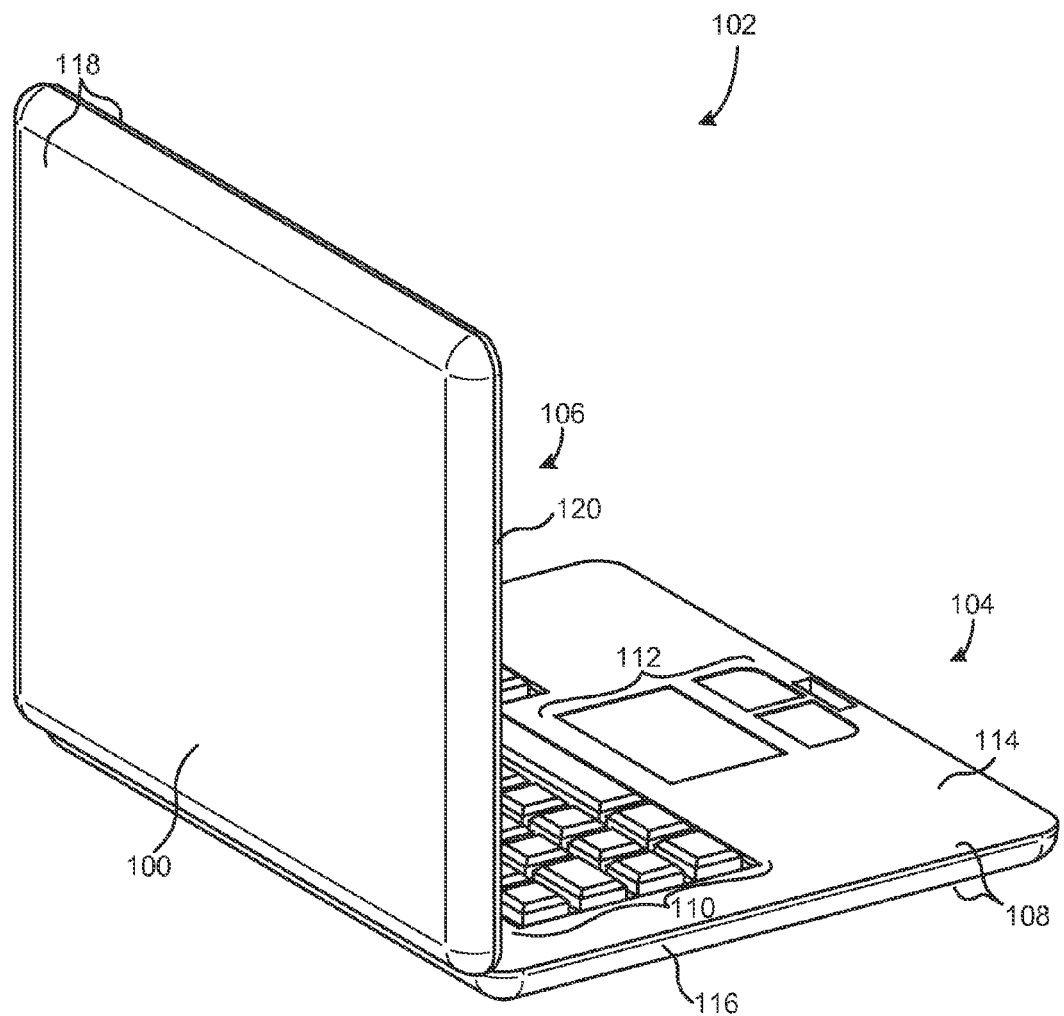
FIG. 1 is a perspective view of an example enclosure mounted on a laptop computer.

FIG. 1 shows a perspective view of a polymer-metal hybrid (PMH) part which, in this particular embodiment, is depicted by way of example as a housing enclosure 100 for a laptop computer 102. As shown, computer 102 includes a base assembly 104 and a display assembly 106 that are pivotally coupled to one another by some suitable means such as, for example, a hinge assembly.

Base assembly 104 includes a housing 108, a keyboard 110, a touchpad 112, and various other well known components (not shown) such as, for example, a frame, motherboard, I/O ports, hard drive, battery, etc. Housing 108 includes a top enclosure 114 and a bottom enclosure 116 that are coupled to one another so as to house keyboard 110, touchpad 112, and the various other components of base assembly 104 that are not shown. Top enclosure 114 includes a bezel or faceplate structure that defines openings that are aligned with keyboard 110 and touchpad 112. Although not shown, bottom enclosure 116 likely includes a removable battery cover that encloses the battery of computer 102 (and other well known laptop computer components).

Display assembly 106 includes a housing 118 and various other well known flip-screen display components (not shown) such as, for example, a liquid crystal display (LCD), frame, speakers, circuit substrates/components, camera module, etc. Housing 118 includes a front enclosure 120 and rear enclosure 100, which are fixably mounted on opposite sides of display assembly 106 so as to house the aforementioned flip-screen display components that are not shown. Front enclosure 120 is a bezel fixably mounted to the front of display assembly 106 so as to cover the peripheral edges the LCD panel. Rear enclosure 100 is fixedly coupled to, for example, the frame and/or some other suitable structure of display assembly 106.

Figure 2:
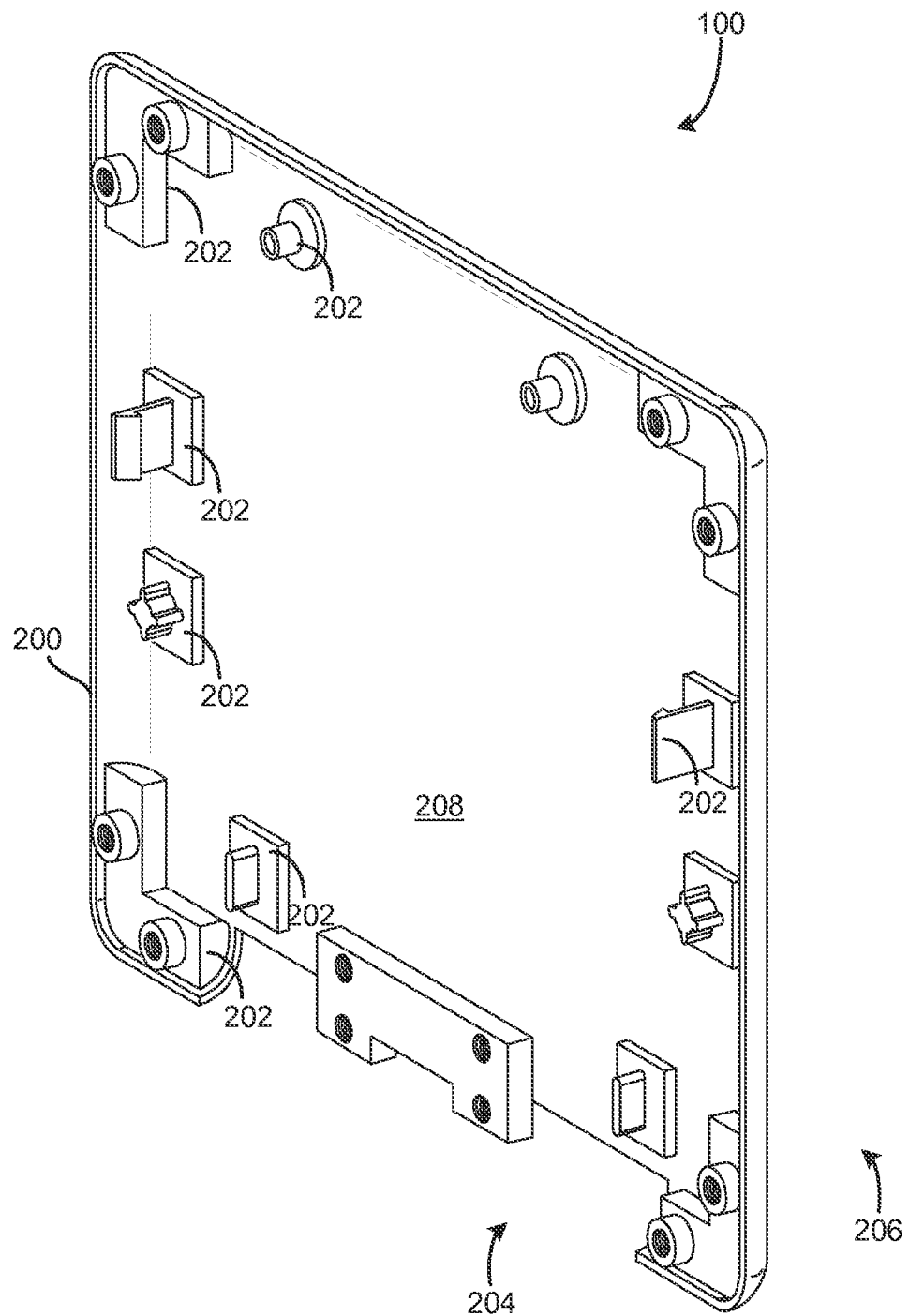
FIG. 2 is a perspective view of the example enclosure shown removed from the laptop computer of FIG. 1.

FIG. 2 is a perspective view of rear enclosure 100 shown removed from the back of display assembly 106 of computer 102. Enclosure 100 includes a metal substrate 200 and a plurality of plastic structures 202 integrally formed into a single PMH part.

Metal substrate 200 includes a front side 204, an opposite back side 206, and an exterior surface 208. As used here, the term "exterior" means external with respect to metal substrate 200, not with respect to the housing which rear enclosure 100 forms a portion of. In this particular embodiment, metal substrate 200 is a thin metal shell that is constructed from, for example, stamped sheet metal (e.g., aluminum 5052). Although metal substrate 200 can be constructed from other types of metals, the inventor has achieved good results using aluminum, titanium, magnesium, and alloys thereof. One important aspect of the present invention is that metal substrate 200 is anodized so as to form a porous oxide layer on exterior surface 208. The irregularities formed on exterior surface 208 via anodizing facilitate the plastic-to-metal bonding between metal substrate 200 and plastic structures 202. Several suitable anodizing processes have been found that can be used to form irregularities on exterior surface 208 such as, for example, sulfuric acid anodizing, phosphoric anodizing, chromic acid anodizing, sulfuric acid anodizing, oxalic acid anodizing, boric acid anodizing, and/or any combination thereof. Of course, the specific anodizing process that is used depends on the specific details of the application such as, for example, the type of metal being anodized.

Plastic structures 202 are depicted by way of example as being three-dimensional mounting structures (e.g., screw bosses, nut/bolt seats, snap fits, etc.) attached directly to metal substrate 200 so as to facilitate the fastening of enclosure 100 to display assembly 106. Plastic structures 202 can also include any other type of plastic structures that can be incorporated into a metal substrate or shell such as, for example, scaffolding, stiffeners, ribs, etc. Plastic features 202 are formed by molding plastic material directly on exterior surface 208 of metal substrate 200 after metal substrate 200 has been anodized.

FIGS. 3A-3E depict various stages of manufacturing enclosure 100. More specifically, FIGS. 3A, 3B, 3C, 3D, and 3E show cross-sectional side views of a small region of metal substrate 200 at a first stage, a second stage, a third stage, a fourth stage, and a fifth stage, respectively, of manufacturing enclosure 100.

Figure 3A:
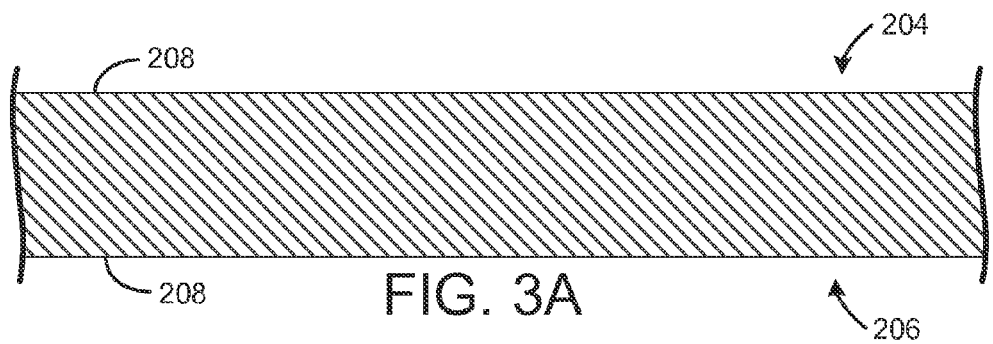
FIG. 3A is cross-sectional view of a metal substrate of the example enclosure of FIG. 1 at a first manufacturing stage.

FIG. 3A illustrates the first stage, wherein metal substrate 200 is shown just after being formed (e.g., stamped) out of raw metal (e.g., sheet metal). During this first stage, metal substrate 200 has not yet been anodized and, therefore, has no irregularities formed on exterior surfaces 208. Preferably, metal substrate 200 is subjected to a pretreatment so as to remove any unwanted contaminants (e.g., stamping lubricants, grease, oxides, organic/inorganic contaminants, etc.) that could otherwise interfere with subsequent processing and decrease the bond strength between plastic features 202 and exterior surface 208. Depending on the specific type of metal and metal forming process used to construct metal substrate 200, the pretreatment might involve degreasing, alkaline cleaning, acid cleaning, rinsing, and/or any other suitable means or for removing unwanted contaminants from metal surfaces 208. Furthermore, the degreasing, alkaline cleaning, and acid cleaning of metal substrate 200 can be carried out using any commercially available chemical reagent that is suitable for the specific type of metal used to form metal substrate 200.

Figure 3B:
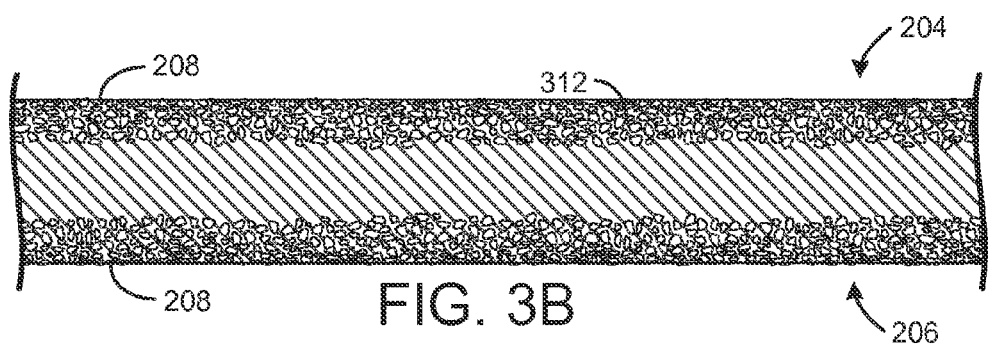
FIG. 3B is cross-sectional view of the metal substrate of FIG. 3A at a second manufacturing stage.

FIG. 3B illustrates the second stage, wherein metal substrate 200 is shown after being anodized. As shown, the anodizing process causes irregularities 312 to form on exterior surface 208.

Figure 3C:
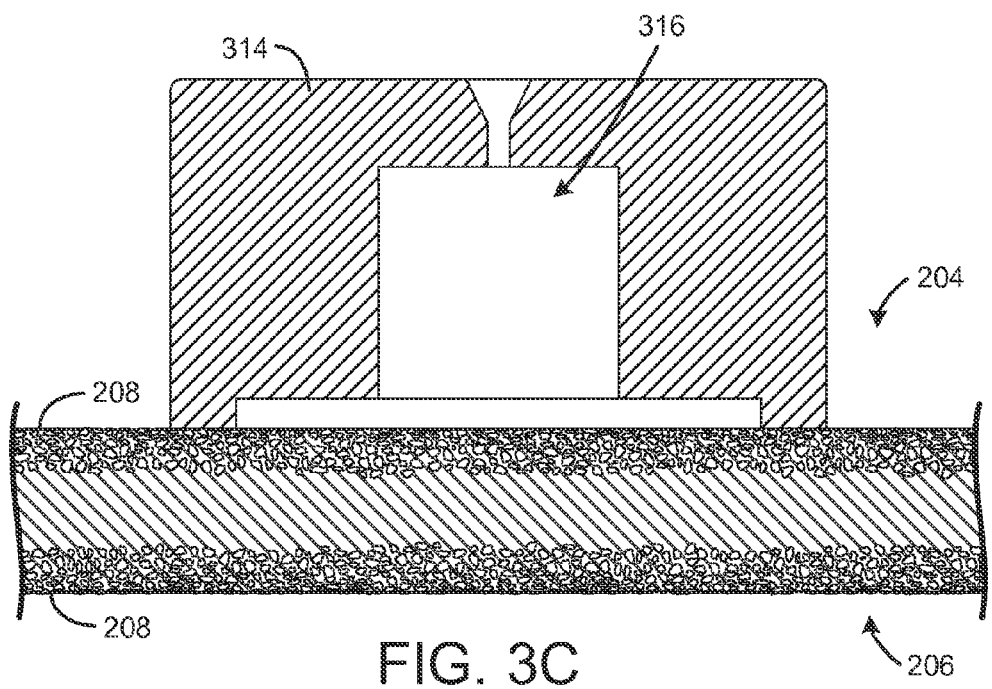
FIG. 3C is cross-sectional view of the metal substrate of FIG. 3A at a third manufacturing stage.

FIG. 3C illustrates third stage 306 wherein at least a portion of metal substrate 200 is enclosed within an insert mold 314. Mold 314 defines a cavity 316 that is enclosed by the cavity wall of mold 314 and exterior surface 208 of metal substrate 200.

Figure 3D:
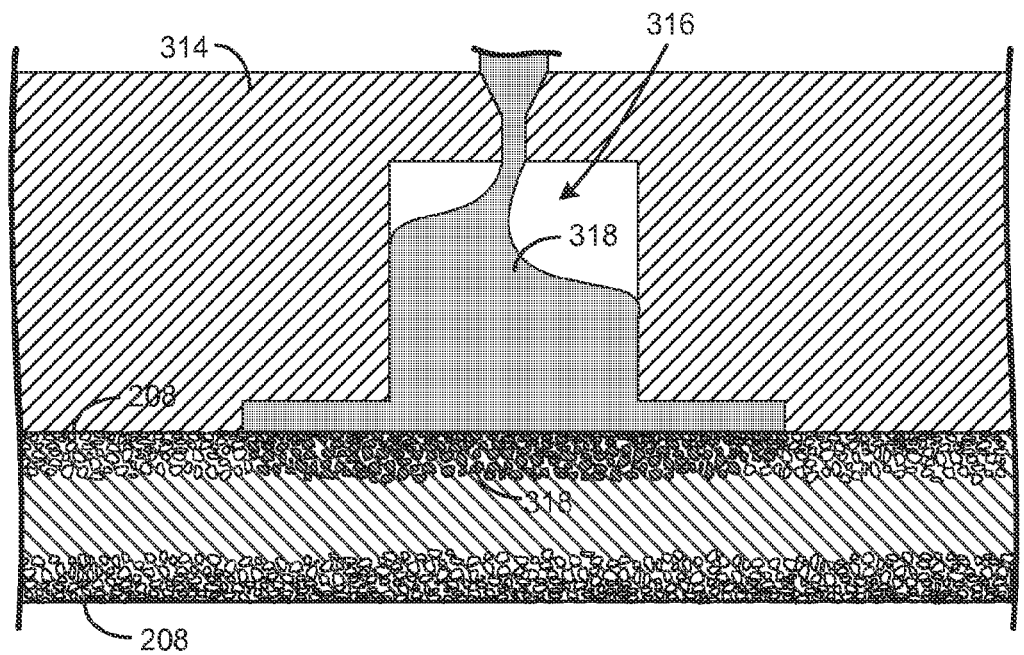
FIG. 3D is cross-sectional view of the metal substrate of FIG. 3A at a fourth manufacturing stage.

FIG. 3D illustrates fourth stage 308 wherein an uncured viscous plastic material 318 is injected into mold cavity 316. While in the liquid state, plastic material 318 infiltrates the porous irregularities defined by exterior surface 208. To better illustrate this, the infiltrated irregularities have been darkened so as to indicate the presence of plastic material 318. It should be understood that the particular type of plastic material 318 used to form plastic structures 202 will vary according to the particular application. However, the inventor has achieved good results using polyamide, polycarbonate, acrylonitrile-butadiene-styrene copolymer, polyphenyl sulfide, polypropylene, polybutylene terephthalate, and polybutylene terephthalate.

Although plastic material 318 is molded on exterior surface 208 directly after metal substrate 200 is anodized, exterior surface 208 could optionally be primed with coupling agents or adhesion promoters before plastic material 318 is applied. For example, exterior surface 208 can be primed with, for example, organosilane, titanate, aluminate, phosphate, and/or zirconate.

Figure 3E:
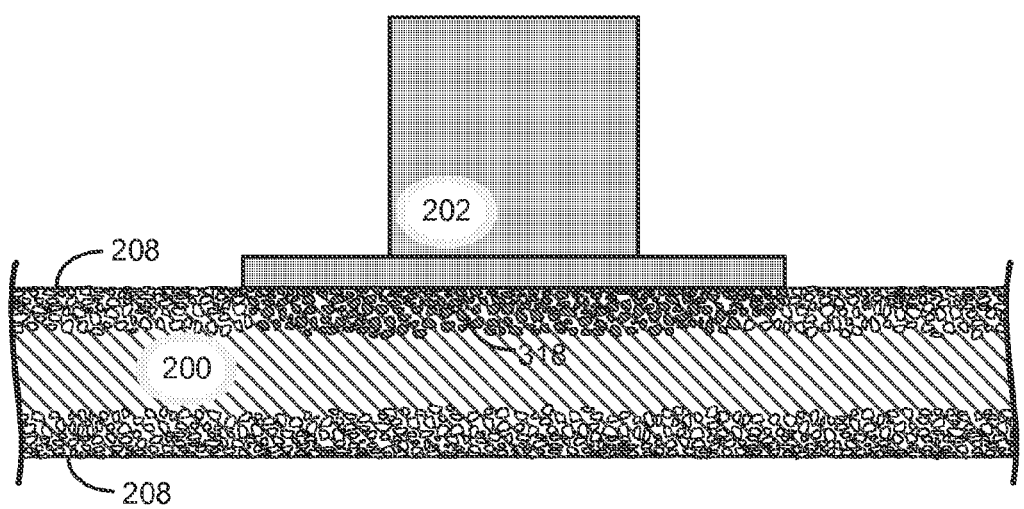
FIG. 3E is cross-sectional view of the metal substrate of FIG. 3A at a fifth manufacturing stage.

FIG. 3E illustrates fifth stage 310 wherein enclosure 100 is shown removed from mold 314, wherein plastic material 318 was cured into plastic structure 202. It should be understood that the plastic material 318 that infiltrated irregularities 312 during the injection stage is now cured within irregularities 312 and, therefore, mechanically bonded to exterior surface 208.

Figure 4:
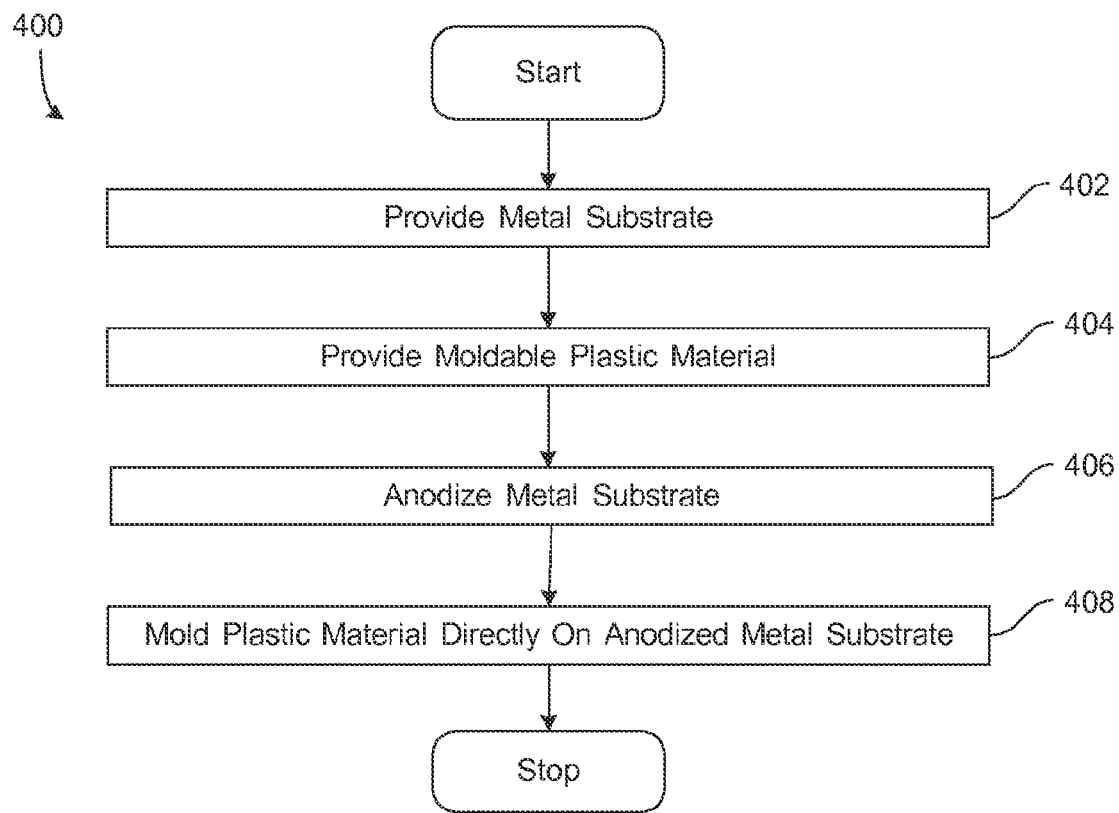
FIG. 4 is a flowchart summarizing an example method for manufacturing a plastic-metal hybrid part according to one embodiment of the present invention.

FIG. 4 is a flow diagram summarizing a method 400 for manufacturing a plastic-metal hybrid part. In a first step 402, a metal substrate is provided. Then, in a second step 404, a moldable plastic material is provided. Next, in a third step 406, the metal substrate is anodized. Finally, in a fourth step 406, the moldable material is molded directly on the anodized metal substrate.

Figure 5:
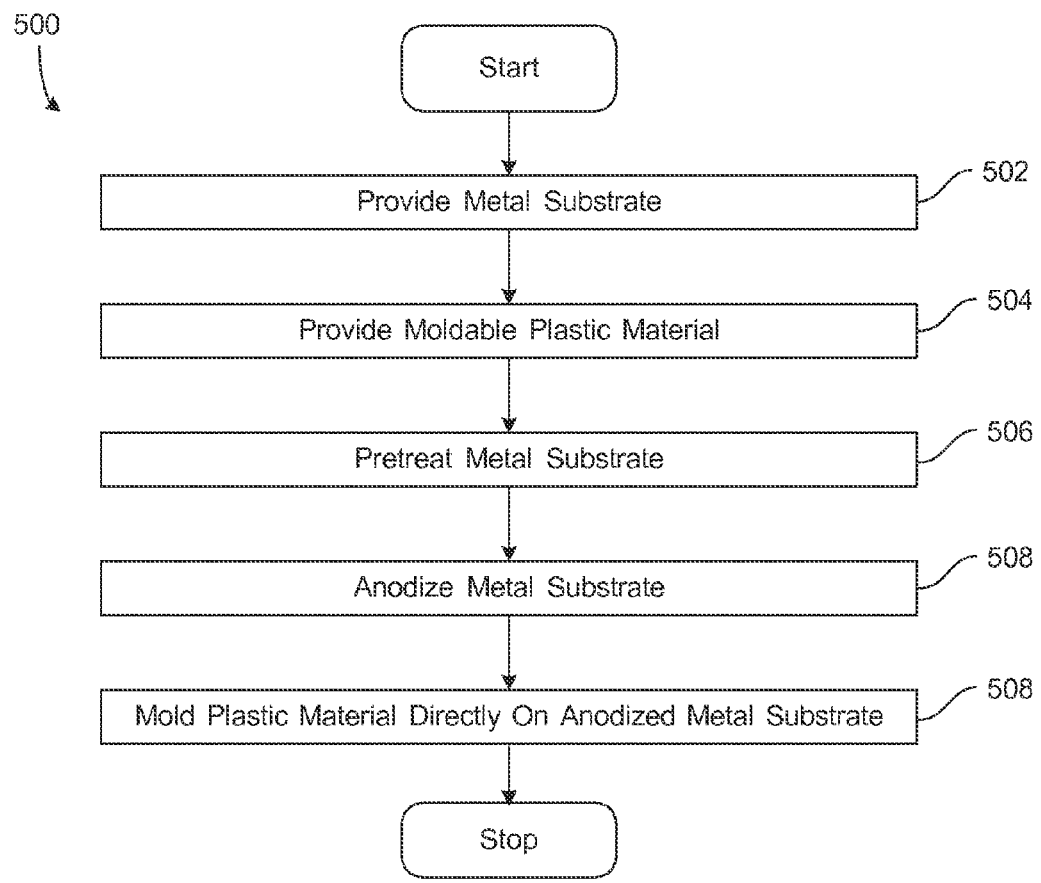
FIG. 5 is a flowchart summarizing another example method for manufacturing a plastic-metal hybrid part according to another embodiment of the present invention.

FIG. 5 is a flow diagram summarizing another method 500 for manufacturing a plastic-metal hybrid part. In a first step 502, a metal substrate is provided. Then, in a second step 504, a moldable material is provided. Next, in a third step 506, the metal substrate is pretreated. Then, in a fourth step 508, the metal substrate is anodized. Finally, in a fifth step 406, the moldable material is molded directly on the anodized metal substrate.

Figure 6:
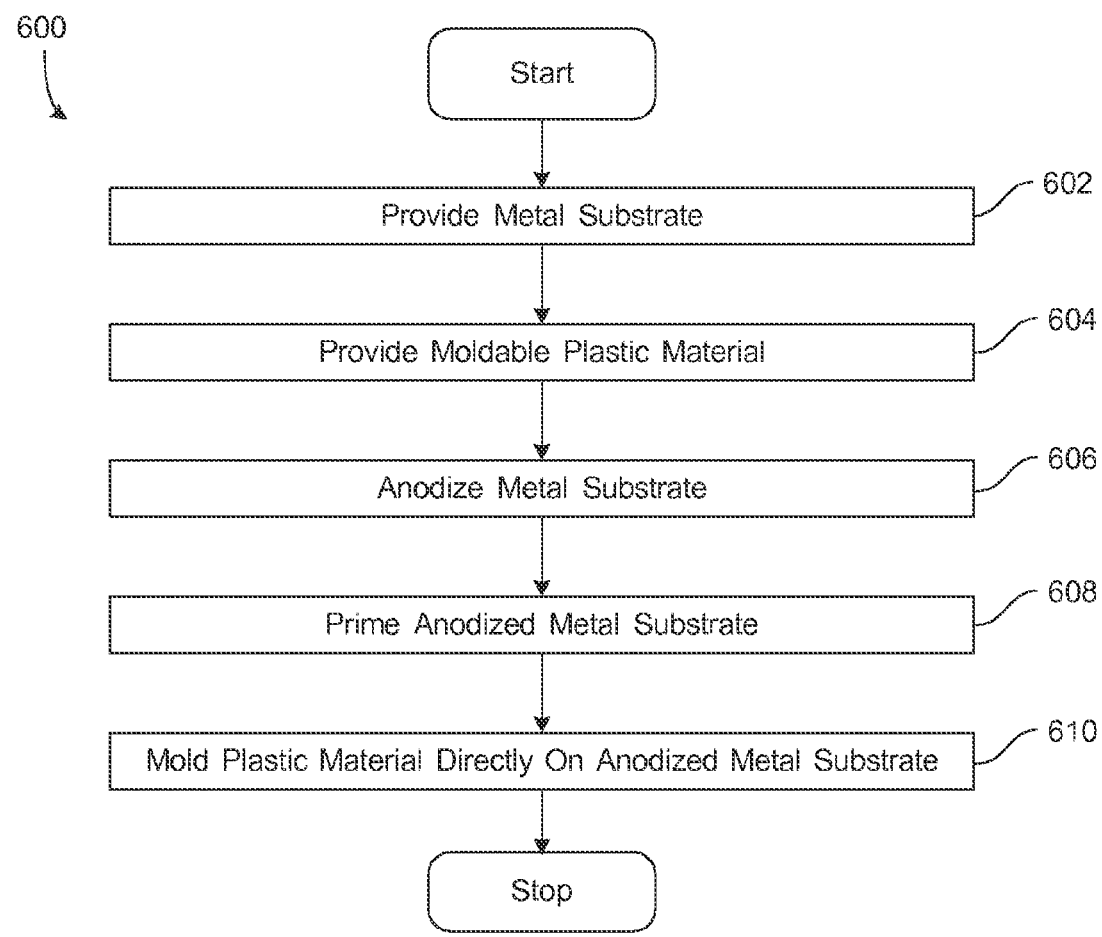
FIG. 6 is a flowchart summarizing another example method for manufacturing a plastic-metal hybrid part according to another embodiment of the present invention.

FIG. 6 is a flow diagram summarizing another method 600 for manufacturing a plastic-metal hybrid part. In a first step 602, a metal substrate is provided. Then, in a second step 604, a moldable material is provided. Next, in a third step 606, the metal substrate is anodized. Then, in a fourth step 608, the anodized metal substrate is primed. Finally, in a fifth step 610, the moldable material is molded directly on the primed anodized metal substrate.

Figure 7:
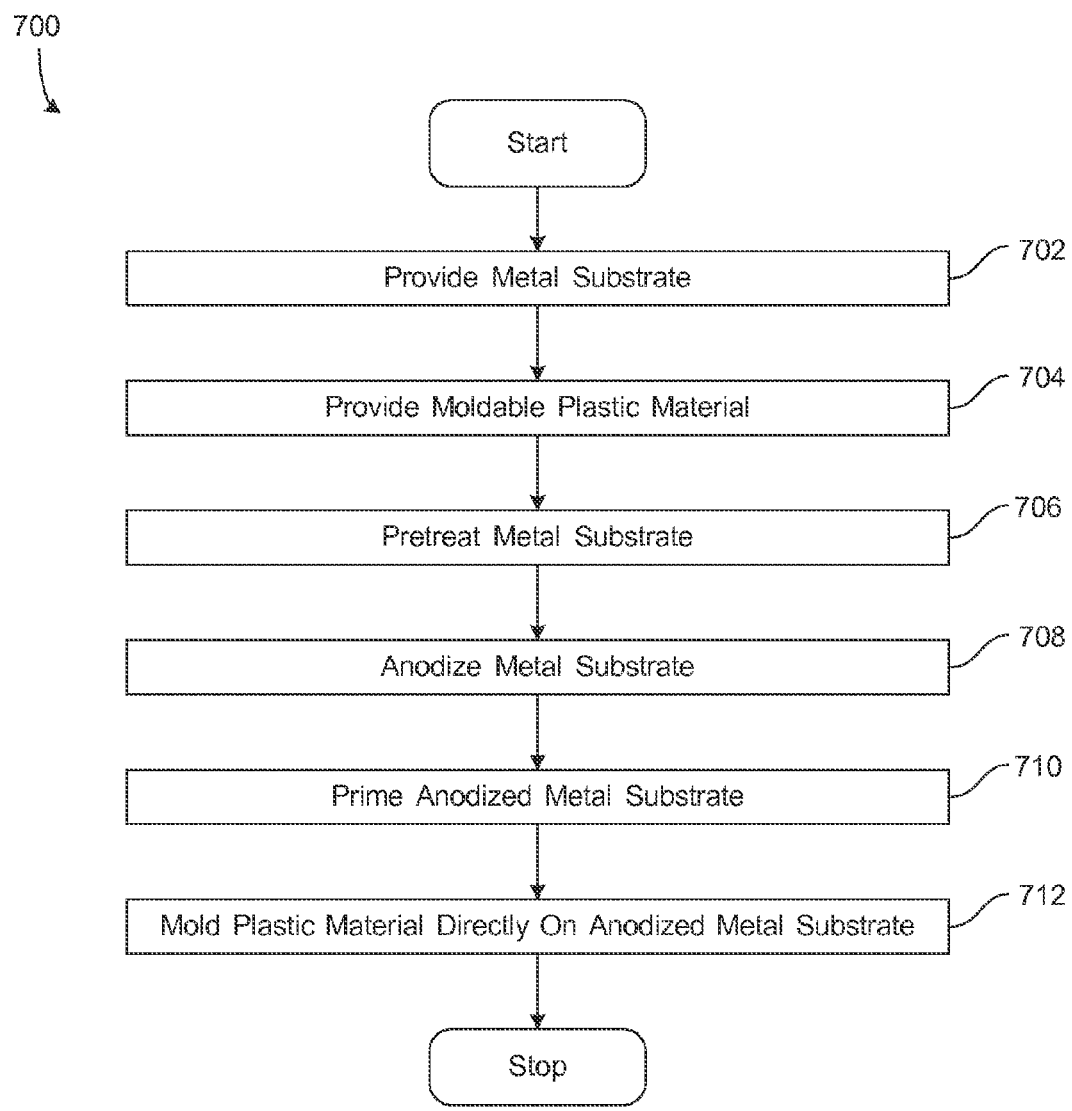
FIG. 7 is a flowchart summarizing another example method for manufacturing a plastic-metal hybrid part according to another embodiment of the present invention.

FIG. 7 is a flow diagram summarizing another method 700 for manufacturing a plastic-metal hybrid part. In a first step 702, a metal substrate is provided. Then, in a second step 704, a moldable material is provided. Next, in a third step 706, the metal substrate is pretreated. Then, in a fourth step 708, the metal substrate is anodized. Next, in a fifth step 710, the anodized metal substrate is primed. Finally, in a sixth step 712, the moldable material is molded directly on the primed anodized metal substrate.

Figure 8:
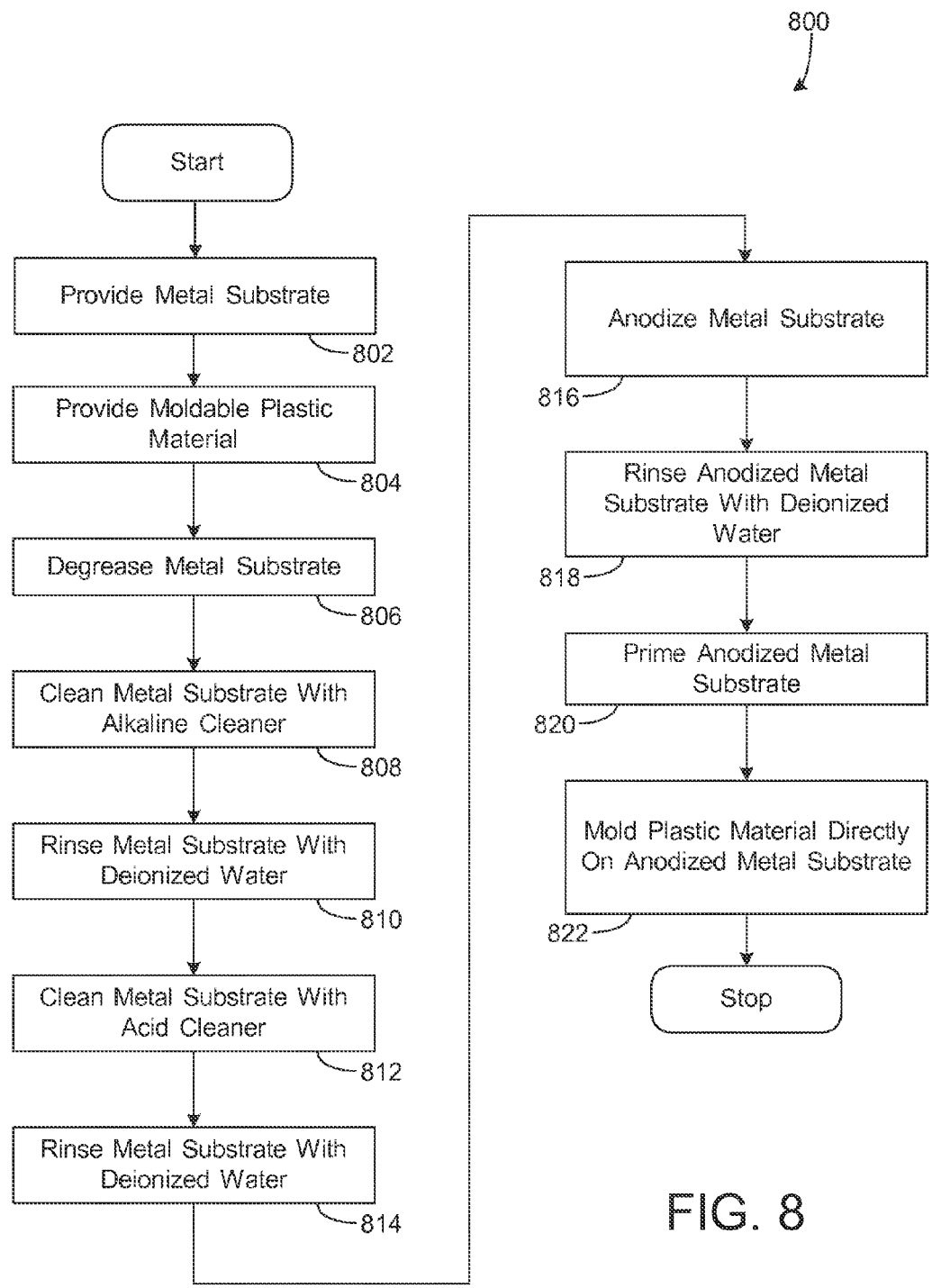
FIG. 8 is a flowchart summarizing another example method for manufacturing a plastic-metal hybrid part according to one embodiment of the present invention.

FIG. 8 is a flow diagram summarizing another method 800 for manufacturing a plastic-metal hybrid part. In a first step 802, a metal substrate is provided. Then, in a second step 804, a moldable material is provided. Next, in a third step 806, the metal substrate is degreased. Then, in a fourth step 808, the metal substrate is cleaned with alkaline cleaner. Next, in a fifth step 810, the metal substrate is rinsed in deionized water. Then, in a sixth step 812, the metal substrate is cleaned with an acid cleaner. Next, in a seventh step 814, the metal substrate is rinsed with deionized water. Then, in an eighth step 816, the metal substrate is anodized. Next, in a ninth step 818, the anodized metal substrate is rinsed with deionized water. Then, in a tenth step 820, the anodized metal substrate is primed. Finally, in an eleventh step 822, the moldable material is molded directly on the primed anodized metal substrate.

Figure 9:
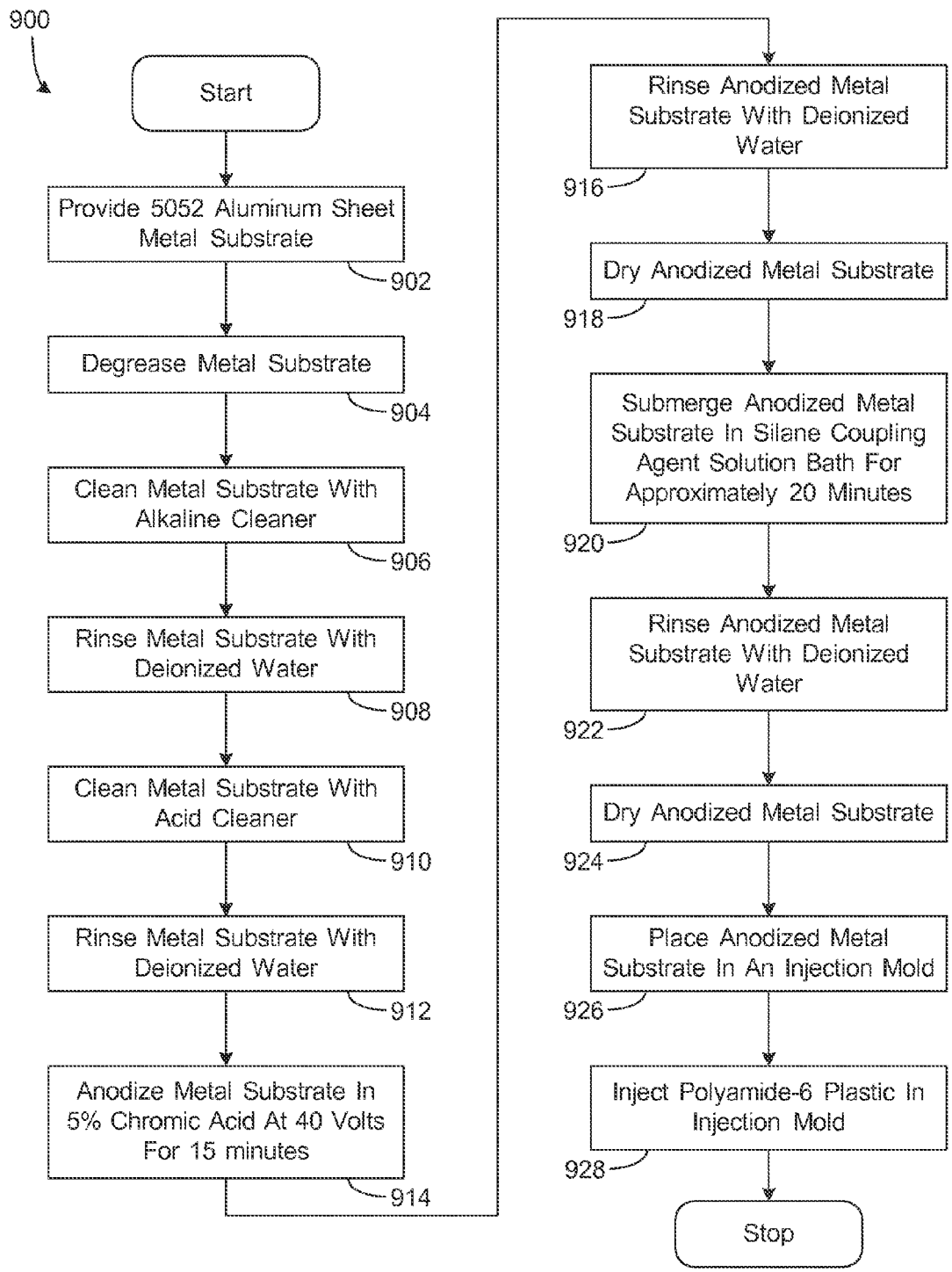
FIG. 9 is a flowchart summarizing another example method for manufacturing a plastic-metal hybrid part according to another embodiment of the present invention.

FIG. 9 is a flow diagram summarizing another method 900 for manufacturing a plastic-metal hybrid part. In a first step 902, a 5052 aluminum sheet metal substrate is provided. Next, in a second step 904, the metal substrate is degreased. Then, in a third step 906, the metal substrate is cleaned with alkaline cleaner. Next, in a fourth step 908, the metal substrate is rinsed in deionized water. Then, in a fifth step 910, the metal substrate is cleaned with an acid cleaner. Next, in a sixth step 912, the metal substrate is rinsed with deionized water. Then, in a seventh step 914, the metal substrate is anodized in 5% chromic acid at 40V for 15 minutes. Next, in an eighth step 916, the anodized metal substrate is rinsed with deionized water. Then, in a ninth step 918, the anodized metal substrate is dried. Next, in a tenth step 920, the anodized metal substrate is submerged in silane coupling agent solution bath for 20 minutes. Then, in an eleventh step 922, the anodized metal substrate is rinsed with deionized water. Next, in a twelfth step 924, the anodized metal substrate is dried. Then, in a thirteenth step 926, the anodized metal substrate is placed in an injection mold. Finally, in a fourteenth step 928, polyamide-6 plastic is molded directly on the primed anodized metal substrate.

Figure 10:
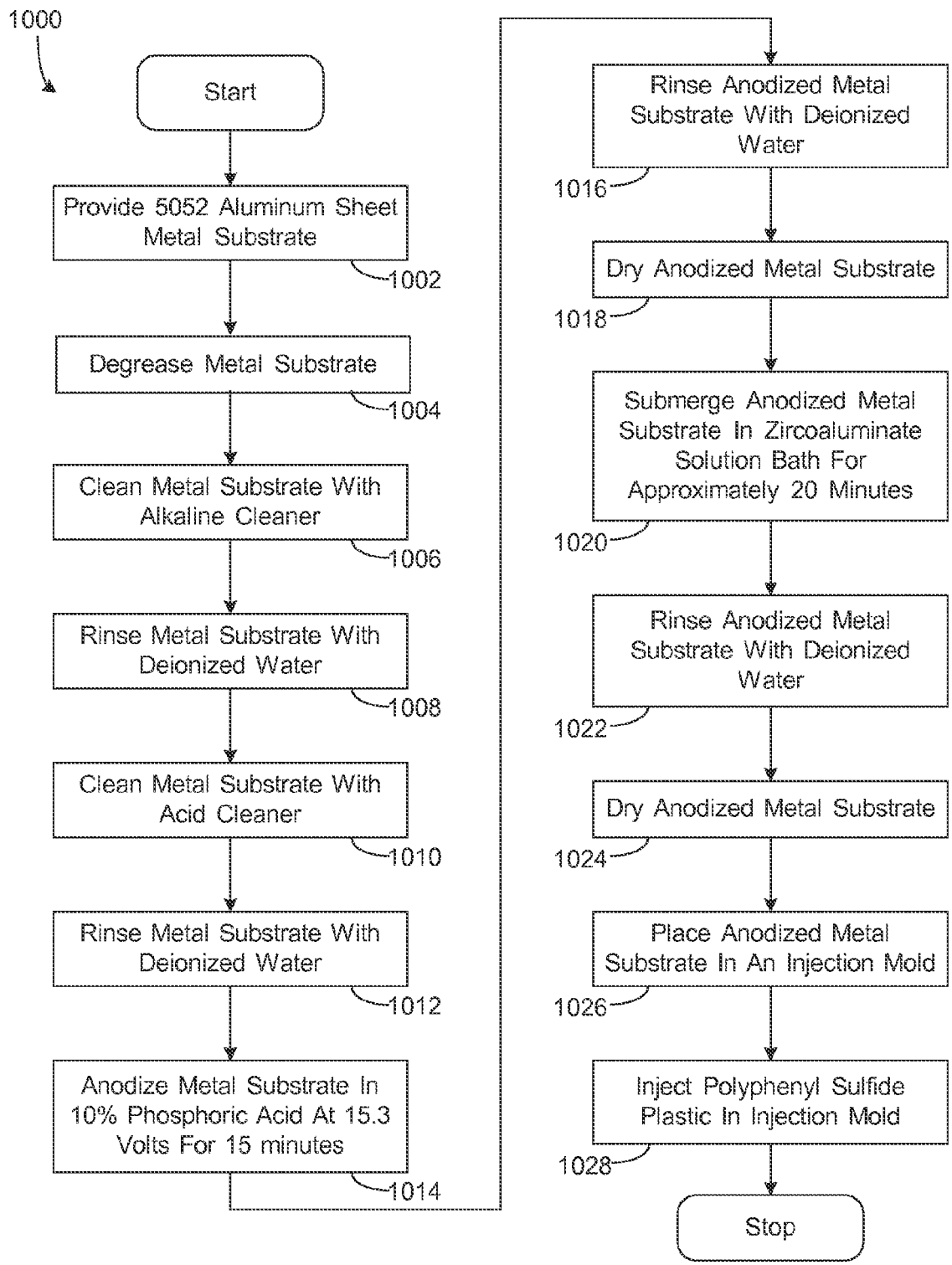
FIG. 10 is a flowchart summarizing another example method for manufacturing a plastic-metal hybrid part according to another embodiment of the present invention.

FIG. 10 is a flow diagram summarizing another method 1000 for manufacturing a plastic-metal hybrid part. In a first step 1002, a 5052 aluminum sheet metal substrate is provided. Next, in a second step 1004, the metal substrate is degreased. Then, in a third step 1006, the metal substrate is cleaned with alkaline cleaner. Next, in a fourth step 1008, the metal substrate is rinsed in deionized water. Then, in a fifth step 1010, the metal substrate is cleaned with an acid cleaner. Next, in a sixth step 1012, the metal substrate is rinsed with deionized water. Then, in a seventh step 1014, the metal substrate is anodized in 10% phosphoric acid at 15.3V for 15 minutes. Next, in an eighth step 1016, the anodized metal substrate is rinsed with deionized water. Then, in a ninth step 1018, the anodized metal substrate is dried. Next, in a tenth step 1020, the anodized metal substrate is submerged in zircoaluminate solution bath for 20 minutes. Then, in an eleventh step 1022, the anodized metal substrate is rinsed with deionized water. Next, in a twelfth step 1024, the anodized metal substrate is dried. Then, in a thirteenth step 1026, the anodized metal substrate is placed in an injection mold. Finally, in a fourteenth step 1028, polyphenyl sulfide plastic is molded directly on the primed anodized metal substrate.

The description of particular embodiments of the present invention is now complete. Many of the described features may be substituted, altered or omitted without departing from the scope of the invention. For example, alternate host device components (e.g., cell phones, PDAs, cameras, etc.), can be substituted for the laptop computer enclosure 100. As another example, alternate types of plastic-metal hybrid parts (e.g., automotive interior faceplates/panels) can substituted for the example enclosure 100 described herein. These and other deviations from the particular embodiments shown will be apparent to those skilled in the art, particularly in view of the foregoing disclosure

I claim:

1. A method for manufacturing a plastic-metal hybrid part, said method comprising: providing a metal substrate having a first exterior surface;
   providing a moldable plastic material;
   anodizing said metal substrate to form irregularities on at least a portion of said first exterior surface of said metal substrate;
   applying a primer material to said exterior surface of said metal substrate whereon said irregularities are formed, said step of applying said primer material to said exterior surface of said metal substrate being carried out after said step of anodizing said metal substrate and before said step of forming said plastic structure on said metal substrate, said primer material being adapted to bond to both said metal substrate and said moldable plastic material, wherein said primer material is selected from the group consisting of organosilane, titanate, aluminate, phosphate, and zirconate;
   forming a plastic structure on said metal substrate by molding said moldable plastic material directly over said irregularities formed on said first exterior surface of said metal substrate; and
   rinsing said metal substrate with deionized water after applying said primer material and before forming said plastic structure.

2. The method of claim 1, wherein said metal substrate is a stamped sheet metal substrate.

3. The method of claim 1, wherein said metal substrate is formed from a material selected from the group consisting of aluminum, 5052 aluminum, aluminum alloy, titanium, titanium alloy, magnesium, and magnesium alloy.

4. The method of claim 1, wherein said step of anodizing said metal substrate includes anodizing said metal substrate using an anodizing agent selected from the group consisting of chromic acid, phosphoric acid, sulfuric acid, oxalic acid, and boric acid.

5. The method of claim 1, wherein said step of molding said moldable plastic includes overmolding said moldable plastic over said irregularities formed on said first exterior surface of said metal substrate.

6. The method of claim 1, wherein said step of molding said moldable plastic includes injection molding said moldable plastic over said irregularities formed on said first exterior surface of said metal substrate.

7. The method of claim 1, wherein said moldable plastic material is selected from the group consisting of polyamide, polycarbonate, acrylonitrile butadiene styrene copolymer, polyphenyl sulfide, polypropylene, polybutylene terephthalate, and polyethylene terephthalate.

8. The method of claim 1, wherein said moldable plastic material is a thermoplastic.

9. The method of claim 1, wherein said moldable plastic material is a transfer moldable thermosetting plastic.

10. The method of claim 1, further comprising subjecting said metal substrate to a pretreatment process prior to said step of anodizing said metal substrate.

11. The method of claim 10, wherein said pretreatment process includes:
   applying a degreasing agent to said metal substrate,
   applying an alkaline solution to said metal substrate after said step of applying said degreasing agent to said metal substrate,
   rinsing said metal substrate with deionized water after said step of applying an alkaline solution to said metal substrate,
   applying an acid solution to said metal substrate after said step of rinsing said metal substrate in deionized water, and
   rinsing said metal substrate with deionized water after said step of applying an acid solution to said metal substrate.

12. The method of claim 10, wherein said pretreatment process includes applying a degreasing agent to said metal substrate.

13. The method of claim 10, wherein said pretreatment process includes applying an alkaline solution to said metal substrate.

14. The method of claim 10, wherein said pretreatment process includes applying an acid solution to said metal substrate.

15. The method of claim 1, wherein said plastic structure is a fastener feature.

16. The method of claim 1, wherein said plastic structure is a mounting boss.

17. The method of claim 1, wherein said plastic structure is a snap-fit fastener.

18. The method of claim 1, wherein:
   said metal substrate is a thin-walled structure; and
   said plastic structure is a stiffener operative to rigidify said thin walled structure.

\* \* \* \* \*